United States Patent [19]
Nilssen

[11] Patent Number: 4,692,667
[45] Date of Patent: Sep. 8, 1987

[54] PARALLEL-RESONANT BRIDGE-INVERTER FLUORESCENT LAMP BALLAST

[76] Inventor: Ole K. Nilssen, Caesar Dr., Barrington Hills, Ill. 60010

[21] Appl. No.: 661,468

[22] Filed: Oct. 16, 1984

[51] Int. Cl.[4] .................... H05B 37/02; H05B 39/04; H05B 41/36
[52] U.S. Cl. ................. 315/209 R; 363/17; 363/58; 315/DIG. 7; 315/244
[58] Field of Search ............... 315/DIG. 5, DIG. 7, 315/244, 209, 243; 333/175, 176, 177, 178; 363/17, 58, 132

[56] References Cited

U.S. PATENT DOCUMENTS

| | | | |
|---|---|---|---|
| 3,896,336 | 7/1975 | Schreiner et al. | 315/DIG. 5 |
| 4,117,377 | 9/1978 | Jimerson et al. | 315/DIG. 7 |
| 4,175,246 | 11/1979 | Feinberg et al. | 315/DIG. 5 |
| 4,259,614 | 3/1981 | Kohler | 315/244 |
| 4,277,726 | 7/1981 | Burke | 315/DIG. 5 |
| 4,346,332 | 8/1982 | Walden | 315/244 |
| 4,392,087 | 7/1983 | Zansky | 315/244 |

*Primary Examiner*—Saxfield Chatmon

[57] ABSTRACT

Center-tapped DC power to a self-oscillating full-bridge inverter-type fluorescent lamp ballast is obtained from a regular power line by way of a voltage doubler. The DC power is supplied to the inverter through an inductor means having two separate windings on a common magnetic core—with one winding being positioned in each leg of the DC power supply. The full-bridge inverter, which comprises four switching transistors connected in usual full-bridge fashion, comprises a center-tapped parallel-tuned L-C circuit connected across its AC output, thereby providing a center-tapped sinusoidal voltage to its load, which consists of a fluorescent lamp connected in series with a current-limiting capacitor. Due to the effect of the inductor means, the current provided to the bridge is substantially constant during a complete period of the inverter's oscillation. The arrangement is symmetrical and provides for the center-tap of the DC voltage source to be at the same potential as the center-tap of the inverter's AC output; which means that the center-tap of this inverter or ballast output may be grounded without the need for using an isolation transformer.

9 Claims, 2 Drawing Figures

PARALLEL-RESONANT BRIDGE-INVERTER FLUORESCENT LAMP BALLAST

BACKGROUND OF THE INVENTION

1. Field of the Invention

The present invention relates to power-line-operated electronic ballasts for gas discharge lamps, particularly of a type that comprises a voltage-doubler in combination with a full-bridge inverter having parallel-resonant output circuitry.

2. Description of Prior Art

Power-line-operated electronic inverter-type ballasts having parallel-resonant output circuitry are well known. One such ballast is described in U.S. Pat. No. 4,277,726 to Burke. However, to achieve an adequate degree of safety from electric shock hazard—as is required to permit listing by Underwriters Laboratories—a ballast of this type generally requires the use of an isolation transformer. However, such an isolation transformer adds significantly to the size, weight and cost of the ballast, in addition to substantially reducing efficiency.

SUMMARY OF THE INVENTION

1. Objects of the Invention

An object of the present invention is that of providing a more efficient and cost-effective electronic ballast for gas discharge lamps.

This, as well as other important objects and advantages of the present invention will become apparent from the following description.

2. Brief Description

In its preferred embodiment, subject invention is a full-bridge inverter-type ballast comprising four switching transistors and which is symmetrically powered from a center-tapped DC voltage source through an inductor means having two windings on a single magnetic core—with one winding positioned in each leg of the DC source. This full-bridge inverter has a center-tapped parallel-resonant L-C circuit connected across its output, and is made to self-oscillate by way of two positive feedback current-transformers, each connected in series with the center-tapped L-C circuit and a lamp load connected in parallel therewith.

The outputs from the current-transformers are applied to the control terminals of the four switching transistors, thereby providing load-proportional drive to these transistors.

The center-tapped DC voltage source, the inductor means and the full-bridge inverter circuit with its two feedback current-transformers are connected together in symmetrical fashion; which provides for the center-tap of the inverter output to be at the same potential as the center-tap of the DC voltage source. The DC voltage source consists of a voltage doubler powered directly from the power line—with the grounded side of the power line being directly connected with the center-tap of the DC source. Thus, with the center-tap of the DC source grounded, the center-tap of the inverter's output is grounded as well; which implies that the gas discharge lamp connected at the inverter's output is symmetrically referenced to ground.

The feedback current-transformers are saturable and so designed as to saturate approximately at the time the inverter's output voltage reaches zero magnitude.

A Zener-type voltage-limiting device is connected directly between the inverter's DC power input terminals, thereby to protect the transistors from voltage transients of excessive magnitude.

DESCRIPTION OF THE PREFERRED EMBODIMENT

1. Details of Construction

Figure 1:
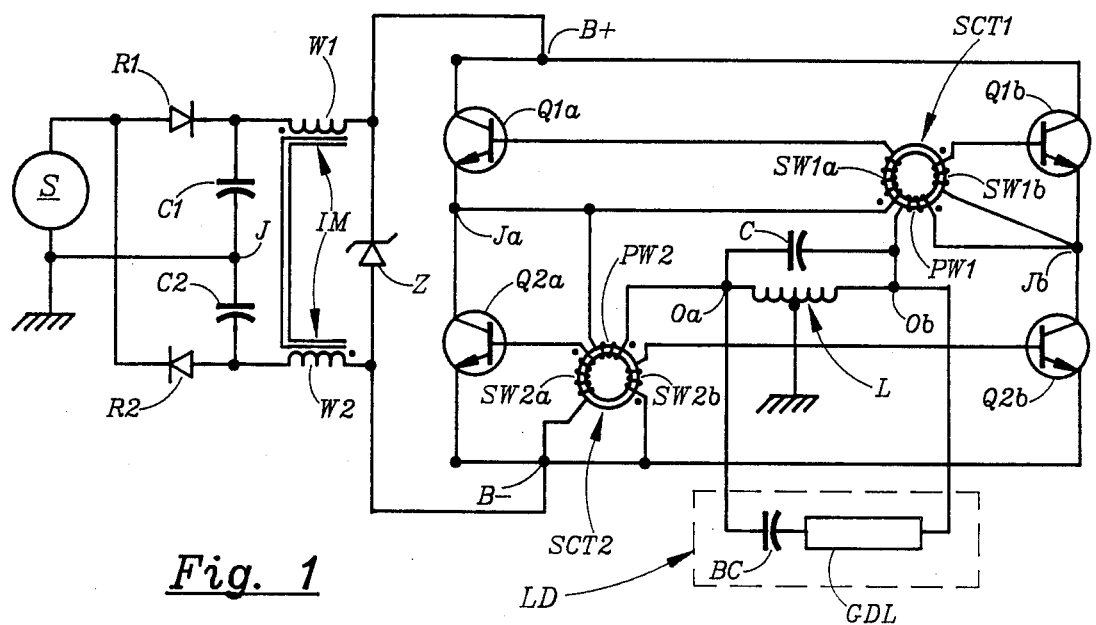
FIG. 1 schematically illustrates the preferred embodiment of the invention.

FIG. 1 shows an AC power supply S, which in reality is an ordinary 120 Volt/60 Hz electric utility power line.

One terminal of power supply S is grounded and also directly connected to a junction J between two energy-storing capacitors C1 and C2. The other terminal of power supply S is connected to the anode of a rectifier R1 and to the cathode of a rectifier R2. Rectifier R1 has its cathode connected to one terminal of C1—the other terminal of C1 being connected to junction J. Rectifier R2 has its anode connected to one terminal of C2—the other terminal of C2 being connected to junction J.

An inductor means IM has two equal but separate windings W1 and W2: W1 is connected between the cathode of rectifier R1 and a junction B+ between the collectors of two transistors Q1a and Q1b; W2 is connected between the anode of R2 and a junction B− between the emitters of two transistors Q2a and Q2b.

A Zener diode Z is connected between junction B+ and junction B−.

Transistor Q1a is connected with its emitter to a junction Ja, as is also the collector of transistor Q2a. Transistor Q1b is connected with its emitter to a junction Jb, as is also the collector of transistor Q2b.

A center-tapped inductor L is connected between inverter output terminal Oa and Ob. Connected in parallel with L is a capacitor C. The center-tap on inductor L is grounded.

Primary winding PW1 of a saturable current-transformer SCT1 is connected between junction Jb and output terminal Ob. Primary winding PW2 of saturable current-transformer SCT2 is connected between junction Ja and output terminal Oa.

One secondary winding SW1a of transformer SCT1 is connected between the base and the emitter of transistor Q1a; another secondary winding SW1b of transformer SCT1 is connected between the base and the emitter of transistor Q1b.

One secondary winding SW2a of transformer SCT2 is connected between the base and the emitter of transistor Q2a; another secondary winding SW2b of transformer SCT2 is connected between the base and the emitter of transistor Q2b.

A series-combination of a ballasting capacitor CB and a gas discharge lamp GDL constitutes a load LD; which load is connected across output terminals Oa and Ob.

2. Description of Operation

The operation of the full-bridge inverter-type ballast circuit of FIG. 1 may be explained as follows.

Source S provides 120 Volt/60 Hz voltage to the voltage-doubling and rectifying/filtering circuit consisting of R1, R2, C1 and C2. A substantially constant DC voltage of about 320 Volt magnitude then results at the output of this circuit, with the positive side of this DC voltage being present at the cathode of R1 and the negative side being present at the anode of R2.

This substantially constant-magnitude DC voltage is applied by way of inducator means IM and its two windings W1 and W2, poled as indicated, to the DC power input terminals B+ and B− of the full-bridge inverter circuit comprising transistors Q1a, Q1b, Q2a and Q2b.

This inverter circuit is made to self-oscillate by way of positive current feedback provided by saturable current-transformers SCT1 and SCT2, poled as indicated. Thus, the magnitude of the current provided to any given transistor's base-emitter junction is proportional to the magnitude of the current flowing between output terminals Oa and Ob.

The frequency of inverter oscillation is determined by a combination of the saturation characteristics of the saturable current-transformers and the natural resonance frequency of the parallel L-C circuit (as combined with the capacitive effect of the lamp loading circuit connected thereacross).

Figure 2:
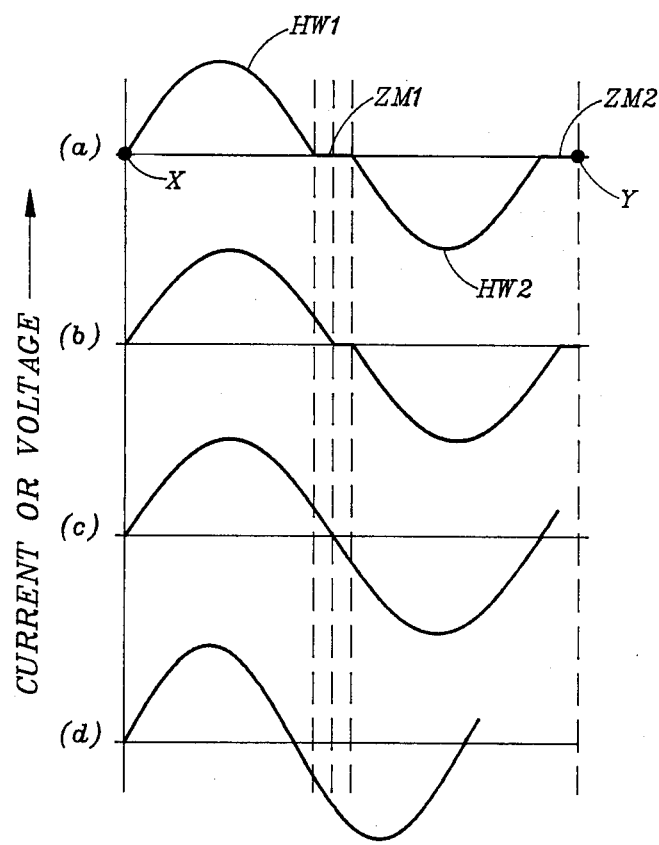
FIG. 2 shows various voltage waveforms associated with the preferred embodiment of the invention.

The saturation characteristics of the saturable current-transformers are substantially identical to one another and so chosen that, when there is no load connected across output terminals Oa and Ob, the waveform of the output voltage is as indicated in FIG. 2a; which waveform is made up of sinusoidal half-waves of voltage, indicated by HW1 and HW2, interconnected with periods of zero-magnitude voltage, indicated by ZM1 and ZM2. This waveform is achieved by making the time-length of the saturation-time required for the saturable current-transformers to reach saturation longer than the time-length of one of the sinusoidal half-waves of voltage. The degree to which the time-length of the saturation-time is longer than the time-length of one of the sinusoidal half-waves of voltage corresponds to the time-length of the periods of zero-magnitude voltage.

In FIG. 2a, each of the sinusoidal half-waves of voltage represents the natural interaction between L and C as fed from a substantially constant current source.

In combination, the two separate but equal windings W1 and W2 of inductor means IM provide for a total inductance that is large enough so that the current flowing through the two windings and into the inverter remains substantially constant during a complete time-period of one cycle of the inverter's oscillation. That is, the DC current flowing into the B+ junction and out of the B− junction is substantially constant during the interval between point X and point Y in FIG. 2a. Thus, whenever the L-C parallel circuit is connected between B+ and B−—which it is during the complete time-length of each of the sinusoidal half-waves of voltage—it is indeed fed from a substantially constant current source.

When a load impedance having a net component of capacitive reactance (such as does LD) is connected across the inverter's output terminals Oa and Ob, capacitive reactance is in effect added to the L-C parallel circuit; which results in the time-lengthening of the sinusoidal half-waves of voltage—as indicated by FIG. 2b. The more capacitance added this way, the more time-lengthening results.

On the other hand, when a load impedance having a net component of inductive reactance is connected between Oa and Ob, the result would be a time-shortening of the sinusoidal half-waves of voltage.

By having two different load impedances connected between Oa and Ob, and by having these two load impedances be of conjugate nature, there will be no net effect on the length of the period of the sinusoidal half-waves. For instance, by having another gas discharge lamp like GDL connected in series with an inducator having a reactance of the same absolute magnitude as that of CB, and by connecting this series-combination in parallel with load LD, the total net load impedance would be resistive and would cause no net shortening or lengthening of the sinusoidal half-waves of voltage.

By making the time-length of the saturation-time of the saturable current-transformers substantially equal to the time-length of one of the sinusoidal half-waves of voltage, the resulting output voltage will be as illustrated in FIG. 2c; which indicates that the net inversion frequency will now be the same as the natural resonance frequency of the L-C parallel circuit (as combined with the load impedance connected thereacross).

By making the time-length of the saturation-time of the saturable current-transformers shorter than the time-length of one of the sinusoidal half-waves of voltage, the resulting output voltage will be as illustrated in FIG. 2d; which indicates the the net inversion frequency will now be higher then the natural resonance frequency of the L-C circuit (as combined with whatever load impedance might be connected between Oa and Ob).

In subject preferred embodiment for ballasting of gas discharge lamps, the time-length of the saturation time of the saturable current-transformers is chosen to be substantially equal to the time-length of one of the sinusoidal half-waves of voltage under the condition of maximum anticipated lamp loading; which implies that the output voltage then provided as the output of the ballasting circuit of FIG. 1 is substantially sinusoidal—as illustrated in FIG. 2c.

With a substantially sinusoidal output voltage, ballasting of (or current-limiting for) a gas discharge lamp properly be accomplished by way of a simple ballasting capacitor—like BC.

It is important to note that, as long as the time-length of the saturation-time of the saturable current-transformers remains equal to or longer than the time-length of one of the sinusoidal half-waves of voltage, the net inversion frequency will not be affected by the addition or removal of a load impedance, such as LD of FIG. 1, regardless of the magnitude of the net reactive impedance thereby added to or subtracted from the L-C parallel circuit.

It is noted that inductor L is center-tapped; which, in effect, provides for a center-tap between the inverter's output terminals Oa and Ob. Because of the symmetrical arrangement of the full-bridge inverter, the electrical potential at this output center-tap is essentially the same as that at the center-tap of the DC source; which therefore permits the grounding of the center-tap of the ballast output—recognizing that the power line is connected with the DC source in such a way that the grounded side of the power line is connected with the center-tap of the DC source.

Since the inverter/ballast output is center-tapped, and since this center-tap is grounded, the voltage between ground and output terminal Oa will be equal in magnitude to the voltage between ground and output terminal Ob. Thus, the chances of receiving an electric shock when servicing the gas discharge lamp can be lessened as compared to the situation where the voltage between ground and one of the output terminals is higher in magnitude than the voltage between ground and the other output terminal—assuming that the magnitude of the voltage between the two terminals is the same in both situations.

In fact, as long as it takes more than half of the full magnitude of the voltage existing between the two output terminals to cause the gas discharge lamp to ignite, it is not going to be possible for a ground-connected person to get an electric shock by making contact with one of the output terminals by way of the gas discharge lamp—as may commonly occur when installing a new lamp.

The magnitude of the Zener voltage of Zener diode Z is chosen such as to be somewhat higher than the maximum magnitude of the peak voltage of the sinusoidal half-waves of voltage present across the inverter's output terminals Oa and Ob. That way, the Zener diode will not interfere with normal operation of the inverter; yet, it will prevent the magnitude of the peak voltages of the sinusoidal half-waves from substantially exceeding the normally occurring maximum magnitudes. Without the Zener diode, for various transient reasons (such as due to the sodium removal of a load) the magnitude of the peak voltages of the sinusoidal half-waves would occasionally become larger than the normally occurring maximum magnitudes; and that would either cause transistor destruction, or it would necessitate the use of very special transistors of exceptionally high voltage capabilities.

It is also noted that inductor means IM may consist of two entirely independent inductors—with one inductor located in each leg of the power supply. In fact, it is even acceptable under some circumstances to use but a single inductor in just one leg of the power supply; in which case, however, it would not be possible to connect the output's center-tap with the power supply's center-tap.

The inverter of FIG. 1 must be triggered into oscillation. This triggering may be accomplished by way of providing a special trigger winding on each of the feedback current-transformers, and then to discharge a capacitor through these trigger windings. This may be done automatically by way of a capacitor-resistor combination connected between B+ and B−, and a Diac for discharging the capacitor through the trigger windings.

Finally, it is noted that the average absolute magnitude of the AC voltage appearing between inverter output terminals Oa and Ob must be substantially equal to the magnitude of the DC voltage provided from across the two series-connected energy-storing capacitors C1 and C2.

Or, stated differently, in the circuit of FIG. 1, if the inverter's AC output voltage as provided between terminals Oa and Ob were to be rectified in a full-wave rectifier, the average magnitude of the DC voltage obtained from this full-wave rectifer would have to be substantially equal to the magnitude of the DC voltage supplied from the DC output of the rectifier/filter combination consisting of R1, R2, C1 and C2.

This relationship would have to exist substantially regardless of the nature of the load connected between the inverter's output terminals.

Although the full-bridge inverter circuit of FIG. 1 may be designed to invert at any one of a wide range of frequencies, in the preferred embodiment the inversion frequency is approximately 30 kHz. Thus, the time-length of the interval between point X and point Y of FIG. 2a is about 33 micro-seconds.

It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. Ballasting means for a gas discharge lamp, comprising:
    a source of relatively low frequency AC voltage, said source having a first and a second AC source terminal, said first AC source terminal being connected with earth ground;
    DC voltage supply powered from said source of AC voltage and operable to provide a DC voltage across a pair of DC terminals, said DC voltage supply having a symmetrical center-tap directly connected with said first AC source terminal;
    bridge inverter connected with said pair of DC terminals and operable to provide a relatively high frequency AC voltage between a first inverter output terminal and a second inverter output terminal, there existing a first voltage between the center and tap of the first inverter output terminal and a second voltage between the center tap and the second inverter output terminal, the first voltage being approximately equal in absolute magnitude but opposite in polarity as compared with the second voltage, and bridge inverter being operable periodically and alternatively to connect each of the inverter output terminals with the DC terminals; and
    output circuit means connected with said inverter output terminals and operable to connect with and to power said lamp.

2. The ballasting means of claim 1 wherein said inverter means is connected with said pair of DC output terminals by way of an inductance means.

3. The ballasting means of claim 2 wherein said high frequency AC voltage is substantially sinusoidal in waveshape.

4. The ballasting means of claim 1 wherein said output circuit means comprises a parallel-resonant L-C circuit, where said L-C circuit comprises an inductor connected in parallel with a capacitor and is parallel-resonant at or near the frequency of said relatively high-frequency AC voltage.

5. The ballasting means of claim 4 where said inductor comprises a center-tap connected with earth ground.

6. In a ballasting means adapted to be powered from the relatively low frequency voltage provided from a regular electric utility power line by way of a first and a second power line conductor and operable to provide a current-limited voltage of relatively high frequency to power a gas discharge lamp, the improvement comprising:
    rectifier means connected with said first and second power line conductors and operable to provide a DC voltage between a pair of DC terminals, there being a first center-point located symmetrically between said DC terminals, said center tap being characterized as having substantially the same electrical potential as said first power line conductor;

inverter connected with said pair of DC terminals and operable to provide a relatively high frequency voltage between a first inverter output terminal and a second inverter output terminal, there existing a first voltage between the center tap and the first inverter output terminal and a second voltage between the center tap and the second inverter output terminal, the first voltage being approximately equal in absolute magnitude but opposite in polarity as compared with the second voltage, the inverter being operable periodically and alternatively to connect each of the inverter output terminals with the DC terminals; and output circuit connected with said inverter output terminals and operable to connect with and to power said lamp.

7. Ballasting means for a gas discharge lamp, comprising:

DC power supply having a a pair of DC terminals and symmetrical center-tap;

inverter connected with said DC power supply and operable to supply a relatively high frequency AC voltage between a first inverter output terminal and a second inverter output terminal, there existing a first voltage between the center tap and the first inverter output terminal and a second voltage between the center tap and the second inverter output terminal, the first voltage being approximately equal in absolute magnitude but opposite in polarity as compared with the second voltage, the inverter being operable periodically and alternatively to connect each of the inverter output terminals with the DC terminals; and output circuit means connected with said output terminals and operable to connect with and to power said lamp;

whereby the magnitude of the voltage provided between said inverter output terminals is significantly higher than that of the voltage existing between either one of the inverter output terminals and the center tap.

8. The ballasting means of claim 7 wherein said power supply is provided with primary power by way of a pair of conductors from an ordinary electric utility power line, and wherein one of said conductors is electrically grounded.

9. The ballasting means of claim 7 comprising means operative to cause said high frequency voltage to be of substantially sinusoidal waveshape.

* * * * *